(12) United States Patent
Nakata et al.

(10) Patent No.: US 7,595,789 B2
(45) Date of Patent: Sep. 29, 2009

(54) TRANSMISSION SCREEN

(75) Inventors: Hirohide Nakata, Fuchu (JP); Ryoko Yanagisawa, Fujisawa (JP); Masahiro Harada, Tokyo (JP); Takeshi Matsushita, Saitama (JP); Makoto Sugiyama, Ryuugasaki (JP)

(73) Assignee: Kimoto Co., Ltd. (JP)

( * ) Notice: Subject to any disclaimer, the term of this patent is extended or adjusted under 35 U.S.C. 154(b) by 734 days.

(21) Appl. No.: 10/562,862

(22) PCT Filed: Jul. 5, 2004

(86) PCT No.: PCT/JP2004/009543

§ 371 (c)(1),
(2), (4) Date: Dec. 29, 2005

(87) PCT Pub. No.: WO2005/003856

PCT Pub. Date: Jan. 13, 2005

(65) Prior Publication Data
US 2007/0091073 A1 Apr. 26, 2007

(30) Foreign Application Priority Data
Jul. 3, 2003 (JP) .............................. 2003-190856

(51) Int. Cl.
G06F 3/041 (2006.01)
G06K 11/06 (2006.01)
G03B 21/56 (2006.01)
G03B 21/60 (2006.01)

(52) U.S. Cl. ....................... 345/173; 345/156; 359/443; 359/452; 359/453; 359/456; 359/457; 178/18.03

(58) Field of Classification Search ......... 345/156–184; 359/443–461; 178/18.01–18.11
See application file for complete search history.

(56) References Cited

U.S. PATENT DOCUMENTS

| 5,495,269 | A  | * | 2/1996 | Elrod et al. ................. 345/179 |
| 6,211,863 | B1 | * | 4/2001 | Chery et al. ................ 345/179 |
| 6,339,748 | B1 | * | 1/2002 | Hiramatsu ................... 345/156 |
| 6,818,276 | B2 | * | 11/2004 | Bourdelais et al. .......... 428/141 |
| 2002/0080482 | A1 | | 6/2002 | Watanabe |
| 2003/0137729 | A1 | * | 7/2003 | Goto et al. .................. 359/457 |
| 2004/0202822 | A1 | * | 10/2004 | Bourdelais et al. .......... 428/143 |

FOREIGN PATENT DOCUMENTS

| JP | 62-294229 | 12/1987 |
| JP | 1-224736  | 9/1989  |
| JP | 4-53944   | 2/1992  |

(Continued)

*Primary Examiner*—David L Lewis
(74) *Attorney, Agent, or Firm*—Bacon & Thomas, PLLC

(57) ABSTRACT

A transmission screen having a writable and erasable surface for one side is provided. This transmission screen is constructed so that the writable and erasable surface should have a specular gloss (JIS K5600-4-7:1999) of 70 to 135%, the transmission screen as a whole should have a haze (JIS K7136:2000) of 80% or more, and the surface opposite to the writable and erasable surface should have a specular gloss (JIS K5600-4-7:1999) of 10% or less. With this transmission screen, writing with a marker for white boards and erasing can be easily done while seeing images projected on the transmission screen, and the images from a projector do not become hard to see due to projection of the images on the body of a writer.

19 Claims, 4 Drawing Sheets

FOREIGN PATENT DOCUMENTS

| | | |
|---|---|---|
| JP | 9-230506 | 9/1997 |
| JP | 10-268428 | 10/1998 |
| JP | 10-287091 | 10/1998 |
| JP | 10-293361 | 11/1998 |
| JP | 2922208 | 4/1999 |
| JP | 2001-290221 | 10/2001 |
| JP | 2002-250807 | 9/2002 |
| JP | 2002-323608 | 11/2002 |

* cited by examiner

TRANSMISSION SCREEN

TECHNICAL FIELD

The present invention relates to a back projection type transmission screen with which an image projected from a projector can be observed from the side opposite to the projector through the screen. In particular, the present invention relates to a transmission screen with which writing with a marker for white boards and erasing are possible on an image projected from a projector.

PRIOR ART

Various boards having functions both of a screen on which an image is projected from a projector and a white board have conventionally been proposed and practically used in order to save spaces for installation and realize more efficient presentation (refer to Patent documents 1 and 2).

However, these screens are reflection type screens for projection from a confronting position with which images projected from a projector are reflected by the screens and a reflected light is observed. Therefore, when writing with a white board marker on an image projected on the screens is desired, writing at a desired position is difficult, because the light from the projector is interrupted by the body of the writer.

Moreover, reflection type screens have a problem that when a writer turns toward those who observe an image on a screen during writing on the screen, the light from a projector is directly irradiated on eyes of the writer and therefore hurt the eyes. Furthermore, if the image from the projector is projected on the body or face of the writer, it is very hard for those who observe the image to see the image.

On the other hand, besides the reflection type screens, various back projection type transmission screens have also developed and proposed, with which an image projected from a projector can be recognized from the side opposite to the projector side with respect the screens (for example, Patent document 3). Many of these have a structure comprising Fresnel lenses and lenticular lenses in combination. Moreover, there are also materials whose haze is increased by using a light diffusing material. However, there are no conventional transmission screen taking writability for writing with a marker into consideration. Even if writing with a marker is possible on such screens, the light emitting surfaces of the screens utilizing lenses suffer from bad erasability because of the uneven shape resulting from the shape of the lenticular lenses. With a material using a light diffusing material, ink of a marker penetrates into the inside of the material, and therefore erasing is impossible.

Patent document 1: Japanese Patent Unexamined Publication (KOKAI) No. 9-230506
Patent document 2: Japanese Patent Unexamined Publication (KOKAI) No. 10-287091
Patent document 3: Japanese Patent Unexamined Publication (KOKAI) No. 10-293361

DISCLOSURE OF THE INVENTION

Object to be Achieved by the Invention

Therefore, an object of the present invention is to provide a transmission screen with which an image from a projector does not become hard to see due to projection of the image on the body of writer, the writer can easily write while seeing the image, and written characters etc. can be easily erased.

Means for Achieving the Object

In order to achieve the aforementioned object, the present invention provides a transmission screen having a writable and erasable surface for one side. In this transmission screen, the writable and erasable surface preferably has a specular gloss (JIS K5600-4-7:1999) of 70 to 135%. Further, the writable and erasable surface is preferably formed with a resin layer containing an ionizing radiation curable resin and a matting agent.

The transmission screen of the present invention preferably has a haze (JIS K7136:2000) of 80% or more, and the surface opposite to the writable and erasable surface preferably has a specular gloss (JIS K5600-4-7:1999) of 10% or less. Moreover, the transmission screen preferably has a light diffusing layer comprising a binder component and light diffusing particles on the side opposite to the writable and erasable surface side.

The present invention also provides a transmission screen having a light incident surface from which a light projected from a projector enters and a light emitting surface on the side opposite to the light incident surface side and forming an image from the light projected from the projector, wherein the light incident surface has a specular gloss (JIS K5600-4-7:1999) of 10% or less, the light emitting surface has a specular gloss (JIS K5600-4-7:1999) of 70 to 135%, and the screen as a whole has a haze (JIS K7136:2000) of 80% or more.

The present invention further provides a transmission screen comprising a substrate having a light diffusing property wherein a light from a projector is projected to one surface of the substrate to form an image, and the projected image can be observed from another surface of the substrate, which is provided on the other surface with a writable layer on which writing with a marker for white boards and erasing are possible.

The present invention further provides a rear projection monitor provided with a projector for projecting an image displayed on an image display unit, a reflection mirror for reflecting a light projected from the projector and a transmission screen having a light incident surface and a light emitting surface and receiving a reflected light from the reflection mirror with the light incident surface to form an image, which utilizes the transmission screen of the present invention as the transmission screen.

Examples of the image display unit include a liquid crystal panel, CRT tube, plasma display etc. for displaying images of personal computers, televisions, video recorders etc.

In the present invention, the term "writable and erasable" means to have a property that writing with a marker for white boards is possible and the written characters etc. are erasable. Moreover, in the present invention, the specular gloss (JIS K5600-4-7:1999) is a ratio of specular reflection light as measured by using glass having a refractive index of 1.567 as a standard, and is a value measured by using a CIE standard illuminant C with a geometric condition of 60°.

Advantages of the Invention

Use of the writable and erasable surface for one surface (light emitting surface) of the transmission screen enables a writer to easily write with seeing images projected from a projector, unlike the cases of reflection type screens. In that occasion, observers can also visually recognize the images by moving their heads to avoid the body of the writer, even when image parts desired to see are hidden by the body of the writer. At least unlike the reflection type screens, when a writer comes in front of the screen, images projected from a projector are never distortedly projected according to the unevenness of the body of the writer, and therefore it becomes no longer hard for observers to see the images. Moreover, as also for the writer, when the writer turns toward the observers while writing on the screen, for example, use of the transmission screen evades direct irradiation of eyes of the writer with light from the projector, and therefore the eyes of the writer are not hurt.

As for writing with a marker for white boards, a higher specular gloss is more preferred from a viewpoint of erasing of the written characters etc., and usual white boards has a specular gloss of 150% or more. However, it was found by the researches of the inventors of the present invention that images projected from a projector, in particular, images of dark colors such as those of black and dark blue, may be whitely observed with a specular gloss of usual white boards. According to the present invention, the specular gloss is adjusted to 70 to 135%, and this can provide the writable and erasable performance for a marker for white boards, and in addition, prevents reduction in sharpness of the images projected from a projector.

BEST MODE FOR CARRYING OUT THE INVENTION

Hereafter, the transmission screen of the present invention will be explained in detail.

The transmission screen of the present invention has characteristics as a transmission screen, and at the same time, has a writable and erasable property for a marker for white boards for one surface, for example, a light emitting surface. In order to have these characteristics, the haze of the screen as a whole is preferably 80% or more, the specular gloss of the light incident surface into which the light projected from a projector enters (surface opposite to the writable and erasable surface) is preferably 10% or less, and the specular gloss of the writable and erasable surface is preferably 70 to 135%.

If the haze is 80% or more, light is diffused even at the edges of the screen, and an image can be uniformly projected on the screen including the edges thereof. More preferably, a haze is 90% or more, which can provide further improvement of the light diffusing performance and images easier to see.

Moreover, by selecting the values of the specular gloss of the light incident surface and light emitting surface to be within suitable ranges, the transmission screen can satisfy well balanced visibility of images and writable and erasable property. Specifically, if the light incident surface has a specular gloss of 10% or less, a light source of the projector provided on the back of the screen is not be transparently seen through the screen. More preferably, if the light incident surface has a specular gloss of 6% or less, uniform brightness can be obtained for the whole image.

Further, if the specular gloss of the writable and erasable surface (light emitting surface) is 70% or more, characters etc. written with a marker for white boards can be easily erased, and if the specular gloss is 135% or less, reflection of outer light and reduction in sharpness of images projected from a projector can be prevented. More preferably, if the specular gloss is 120% or less, the reduction in sharpness of the images can be further prevented, and adhered fingerprints can be made invisible.

The transmission screen of the present invention preferably shows a total light transmission (JIS K7361-1:1997) of 60% or more as a more preferred characteristic. If the total light transmission is 60% or more, the light from a projector can fully be transmitted, and thus images can be sharply projected. More preferably, if the total light transmission is 80% or more, the light transmission is further improved, and therefore images can be more sharply projected.

Further, the writable and erasable surface preferably has a wet tension (JIS K6768:1999) of 25 mN/m or more, and a ten point mean roughness (JIS B0601:1994) Rz ($Rz_{JIS94}$) of 0.2 to 2.0 μm as preferred characteristics.

If the wet tension of the writable and erasable surface is 25 mN/m or more, erasing property for adhered fingerprints can be made favorable. Moreover, if the ten point mean roughness Rz is 0.2 to 2.0 μm, the fingerprint erasing property can be made more favorable, and therefore fingerprint ingredients can be substantially wiped, and even if a small amount of fingerprint ingredients that are not wiped remain, the ingredients that are not wiped can be made invisible.

Further, surface hardness of the writable and erasable surface is desirably HB or higher, preferably H or higher, in terms of pencil hardness, as a preferred characteristic. Because writing with a marker for white boards and erasing are repeated on the writable and erasable surface, the surface is prone to be scratched. If it is scratched, sharp images can no longer be projected on it. If the surface has a pencil hardness of HB or higher, scratches due to repetition of writing and erasing can be prevented.

Hereafter, the structure and elements of the transmission screen having the aforementioned characteristics will be explained. The transmission screen of the present invention may take various forms so far as it has a light incident surface into which light projected from a projector enters and a writable and erasable light emitting surface on the opposite side with respect to the light incident surface and having the aforementioned characteristics. Specific examples of the structure of the transmission screen of the present invention are exemplified in FIGS. 1 to 6. All are provided with a substrate 1 having a light diffusing property and a writable and erasable surface 2 as the fundamental configuration.

FIGS. 1 to 3 each show a transmission screen in which the writable and erasable surface 2 is formed on the substrate 1 having a light diffusing property. The transmission screen 3 shown in FIG. 1 comprises a substrate 11, a light diffusing layer 12 on one surface of the substrate 11 and a resin layer 22 on the other surface as the substrate 1 having a light diffusing property for forming images projected form a projector, and the surface of the resin layer 22 serves as the writable and erasable surface 2.

In the transmission screen 3 shown in FIG. 2, the substrate 1 having a light diffusing property consists of a single layer. The substrate 1 having a light diffusing property has a resin layer 22 on one surface, and the surface of the resin layer 22 serves as the writable and erasable surface 2. However, if the substrate 1 having a light diffusing property consists of a single layer as shown in FIG. 2, a significant amount of light diffusing particles should be contained in the substrate 1 having a light diffusing property in order to obtain a haze and specular gloss of one surface within the predetermined ranges, and thereby the physical strength of the substrate 1 having a light diffusing property tends to decrease. Therefore, as the substrate 1 having a light diffusing property, such a substrate comprising the substrate 11 and the light diffusing layer 12 on one surface of the substrate 11 as shown in FIG. 1 is preferred.

In the transmission screen shown in FIG. 1, the light diffusing layer 12 is formed on one surface of the substrate 11. The transmission screen 3 shown in FIG. 3 is different from that shown in FIG. 1 in that light diffusing layers 12 are formed on both surfaces of the substrate 11. The resin layer 22 constituting the writable and erasable surface is formed on one of the light diffusing layers 12. As described above, the light diffusing layer 12 may be provided anywhere in the substrate so long as the haze of the transmission screen becomes 80% or more when the transmission screen is constructed.

The transmission screens shown in FIGS. 1 to 3 are integrally formed with the substrate 1 having a light diffusing property and the surface 2 having a writable and erasable property. However, the substrate 1 having a light diffusing property and the surface 2 having a writable and erasable property may be adhered or superimposed in combination of other materials, if needed. For example, the transmission screen shown in FIG. 4 is formed by adhering a substrate 11 on which a resin layer 22 is formed on one surface and another substrate 11 on which a light diffusing layer 12 is formed on one surface via another substrate 11' (e.g., glass, plastic plate etc. mentioned above) with providing an adhesive layer 13 on the other surface of each substrate 11. In this case, the transmission screen can also be prepared by fixing the four corners with clips or the like without providing the adhesive layers 13. Such a transmission screen may be formed in any order of the resin layer, the light diffusing layer and the adhesive layer.

Further, the transmission screen shown in FIG. 5 is formed by interposing a substrate 11 on which a light diffusing layer 22 is formed on one surface between two of other substrates 11' (e.g., glass, plastic plate etc. mentioned above) to form a substrate 1 having a light diffusing property and adhering the substrate 1 with a substrate 11 on which writable and erasable surface 2 is formed by providing a resin layer 22 or the like via an adhesive layer 13. In this transmission screen, the surface made to have a predetermined value of specular gloss (the surface of the light diffusing layer 12) and the other substrate 11' can be disposed to provide a gap between them so that a light source of the projector should not be transparently seen through the screen.

Further, the transmission screen shown in FIG. 6 is formed by obtaining a specular gloss of 70 to 135% for one surface of the substrate 11 by adding a matting agent into the substrate 11 or other means to form the writable and erasable surface 2 and forming a light diffusing layer 12 on the other surface. For such a transmission screen, it is preferable to use a material having high surface hardness among the glass, plastic films etc. explained above for the substrate 11 for prevention of scratching, and such a material can be melted, mixed with a matting agent and molded into a shape of plate or film to prepare the substrate.

As described above, the substrate 1 having a light diffusing property can be formed by, for example, providing a light diffusing layer 12 on one surface of a substrate 11 (FIG. 1), adding light diffusing particles into a substrate 1 (FIG. 2), providing light diffusing layers on both surfaces of a substrate 11 (FIG. 3), adhering a substrate 11 on which a light diffusing layer 12 is formed on one surface and an adhesive layer 13 is formed on the other surface to another substrate 11' (FIG. 4), or interposing such a substrate 1 having a light diffusing property as shown in FIGS. 1 to 3 between other substrates 11' (FIG. 5). Moreover, the substrate 1 can also be prepared by directly performing embossing for the substrate 11 as described above without providing a light diffusing layer.

Further, the writable and erasable surface 2 can be prepared by, for example, providing a resin layer 22 on the surface opposite to the surface having the predetermined specular gloss of the substrate 1 having a light diffusing property (FIGS. 1 to 3), adding a matting agent into a substrate 11 (FIG. 6), or adhering a substrate 11 on which a resin layer 22 is formed on one surface and an adhesive layer 13 is formed on the other surface to another substrate 11' (FIGS. 4 and 5).

Moreover, the writable and erasable surface 2 can also be prepared by directly performing embossing for the substrate 11 as described above without providing a resin layer.

The transmission screen of the present invention can be prepared by suitably selecting the substrate 1 having a light diffusing property and the writable and erasable surface 2 that can be prepared as described above.

Hereafter, the components of the transmission screen of the present invention will be explained respectively.

The writable and erasable surface 2 is preferably constituted by a resin layer formed from a resin such as a heat-curing type resin or an ionizing radiation curable resin and a matting agent. As the resin, an ionizing radiation curable resin is especially preferred. By forming the writable and erasable surface 2 with a curable resin and a matting agent, specular gloss required for the writable and erasable surface can be easily obtained, and moreover, the preferred characteristic, a surface hardness of HB or higher, preferably H or higher, can be obtained.

As the ionizing radiation curable resin, a photopolymerizable prepolymer that can be crosslinked and thereby cured by radiation of ionizing radiation (ultraviolet ray or electron beam) can be used, and as such a photopolymerizable prepolymer, an acrylic prepolymer having two or more acryloyl groups in one molecule and forming a three-dimensional reticular structure as a result of curing by crosslinking is particularly preferably used. As such an acrylic prepolymer, urethane acrylates, polyester acrylates, epoxy acrylates, melamine acrylates and so forth can be used. Although these can be used alone, it is preferable to add a photopolymerizable monomer in order to further improve the curing property by crosslinking and hardness of coated film cured by crosslinking.

As the photopolymerizable monomer, one or more kinds of monomers are used, which are selected from monofunctionl acrylic monomers such as 2-ethylhexyl acrylate, 2-hydroxyethyl acrylate, 2-hydroxypropyl acrylate and butoxyethyl acrylate, bifunctionl acrylic monomers such as 1,6-hexanediol diacrylate, neopentylglycol diacrylate, diethylene glycol diacrylate, polyethylene glycol diacrylate and hydroxypivalic acid ester neopentylglycol diacrylate, polyfunctionl acrylic monomers such as dipentaerythritol hexacrylate, trimethylpropane triacrylate, and pentaerythritol triacrylate, and so forth.

Further, when the resin is cured by ultraviolet irradiation, it is preferable to use an additive such as a photopolymerization initiator and a photopolymerization accelerator, besides the photopolymerizable prepolymer and photopolymerizable monomer mentioned above.

Examples of the photopolymerization initiator include acetophenone, benzophenone, Michler's ketone, benzoin, benzyl methyl ketal, benzoyl benzoate, α-acyloxime esters, thioxanthones and so forth.

The photopolymerization accelerator is an agent that can reduce polymerization disturbance caused by air during curing to increase the curing rate, and examples include p-dimethylaminobenzoic acid isoamyl ester, p-dimethylaminobenzoic acid ethyl ether and so forth.

Further, so long as the advantages of the present invention are not degraded, other thermoplastic resins and heat-curing type resins may be blended.

As the matting agent, inorganic pigments such as those of silica, alumina, talc, zirconia, zinc oxide, titanium oxide, calcium carbonate and barium sulfate, resin beads such as those of silicone resins, (meth)acrylic resins, styrene resins, benzoguanamine resins and urethane resins, and so forth can be used independently or as a combination of two or more kinds of them. In particular, if resin beads alone are used, images projected from a projector may be blurred due to the lens effect and thus become hard to see. Therefore, the matting agent preferably contains an inorganic pigment. Moreover, by adding an inorganic pigment to the matting agent, the specular gloss can be adjusted to 135% or less with a smaller amount of resin beads as compared with the case using only the resin beads, and therefore even when images are blurred by the lens effect, the degree thereof can be reduced.

The shape of such a matting agent is not particularly limited, and it may be any of irregular form, truly spherical form, spherical form, scaly form, acicular form and so forth. The size of the matting agent may be suitably selected depending on the thickness of the resin layer, and therefore it is not particularly limited. However, a matting agent having a size of about 1 to 20 μm, preferably about 4 to 10 μm, is suitably used. A matting agent at least a part of which protrudes from the resin layer is preferably selected. By making a part of the matting agent protrude from the resin layer, it becomes easy to adjust the specular gloss to 70 to 135%.

The content of the matting agent in the resin layer cannot be uniquely defined, because it may vary depending on the type of the matting agent and thickness of the resin layer. However, as for the lower limit, it is desirably used in an amount of 2 parts by weight or more, preferably 5 parts by weight or more, and as for the upper limit, it is desirably used in an amount of 40 parts by weight or less, preferably 15 parts by weight or less, with 100 parts by weight of the binder component. Within such a range of the content of the matting agent, the total light transmission can be 60% or more, and it becomes easy to adjust the specular gloss to be 70 to 135%.

Further, so long as the functions of the transmission screen of the present invention are not degraded, the resin layer may be added various additives such as crosslinking agents, lubricants, dyes, fluorescent brightening agents, colorants, pigments, antistatic agents, flame retardants, antibacterial agents, antifungal agents, ultraviolet absorbers, light stabilizers, heat stabilizers, antioxidants, plasticizers, leveling agents, flow regulators, antifoams and dispersing agents.

The thickness of the resin layer is determined depending on the size, content etc. of the matting agent, and a specific specular gloss can be obtained by adjusting the thickness. Therefore, when the size and content of the matting agent mentioned above are taken into consideration, the thickness is, as for the lower limit, desirably 2 μm or larger, preferably 5 μm or larger, and as for the upper limit, desirably 20 μm or smaller, preferably 10 μm or smaller. If the thickness of the resin layer is 2 μm or larger, sufficient antiscratching property can be obtained, and a specular gloss of 70% or more can be obtained. If the thickness of the resin layer is 20 μm or smaller, the specular gloss can be adjusted to be 135% or less, and unevenness of the surface can be prevented. Moreover, such a thickness can reduce the dose of ionizing radiation, and therefore the productivity can be improved.

As for the method for adjusting the specular gloss of the surface of the resin layer having such a configuration as described above to 70 to 135%, it can easily be adjusted by controlling the content and size of the matting agent to be contained in the resin layer and the thickness of the resin layer, and it can also be easily adjusted by, for example, subjecting the resin layer to sandblast, chemical etching or the like. Moreover, when the substrate on which the resin layer is coated is a plastic film, the specular gloss can also be adjusted by embossing. The specular gloss can also be adjusted by forming the resin layer beforehand on a film of which surface shape is adjusted and transferring this resin layer to a substrate.

As for the configuration of the writable and erasable surface 2, besides the resin layer formed from an ionizing radiation curable resin and a matting agent explained above, the aforementioned sandblast, chemical etching and embossing can be directly performed for the surface to adjust the specular gloss to be 70 to 135% and thereby obtain the writable and erasable surface without providing the resin layer.

Hereafter, the substrate 1 having a light diffusing property consisting of a substrate 11 and a light diffusing layer 12 comprising a binder component and light diffusing particles formed on at least one surface of the substrate 11 (the one used for the transmission screens of FIGS. 1 and 3 to 5) will be explained.

The substrate 11 is not particularly limited so long as it has a light transmitting property, and those in the form of plate or film consisting of glass or plastics and so forth can be used. Further, plastic films adhered to each other, plastic film adhered to a glass plate and so forth may also be used as the substrate. Such plastic film and glass plate can be adhered by adsorption attained by static electricity, adsorption attained by sucker printing, adhesion attained by a tackifier or adhesive, or the like.

Although the type of glass is not particularly limited, oxidized glass such as silicate glass, phosphate glass and borate glass is generally practically useful, and silicic acid glass, silicate glass such as alkali silicate glass, soda lime glass, potash lime glass, lead glass, barium glass and borosilicate glass is especially preferred.

As the plastics, for example, polyethylene terephthalate, polybutylene terephthalate, polyethylene naphthalate, polycarbonate, polypropylene, polyethylene, polyarylate, acrylic resin, acetyl cellulose, polyvinyl chloride and so forth can be used, and those subjected to stretching, especially biaxial stretching, are preferred, because mechanical strength of such materials are improved.

Although the thickness of such a substrate can be suitably chosen for a material used, it is generally desirable that the thickness is 25 μm or larger, preferably 50 μm or larger, as for the lower limit, and 30 mm or smaller, preferably 20 mm or smaller, as for the upper limit, in view of handling property and so forth.

Further, an easy adhesion treatment may be performed for the surface of the substrate for the purpose of improving adhesion to the light diffusing layer described later, or an easy adhesion layer may be separately provided.

The light diffusing layer is formed from a binder component and light diffusing particles uniformly dispersed in the binder component, and as the binder component, a polymer resin showing good adhesion to the aforementioned substrate is preferably used.

Although such a polymer resin is not particularly limited, there can be used, for example, thermoplastic resins, heat-curable resins, ionizing radiation curable resins and so forth having a light transmitting property such as polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins and fluorocarbon resins. When such a light diffusing layer is cured by ultraviolet irradiation like the resin layer mentioned above, additives such as photopolymerization initiator and photopolymerization accelerator are preferably used.

As the light diffusing particles, those similar to the materials mentioned for the matting agent, i.e., inorganic pigments such as those of silica, alumina, talc, zirconia, zinc oxide, titanium oxide, calcium carbonate and barium sulfate, resin beads such as those of silicone resins, (meth)acrylic resins, styrene resins, benzoguanamine resins, urethane resins, and so forth can be used alone or as a combination of two or more kinds of them. In particular, from the viewpoint of making the light source of the projector harder to see, those having a larger difference in refractive index with respect to the binder component are more preferred. And if resin beads alone are used, images projected from a projector may be blurred due to the lens effect and thereby become hard to see, and therefore the light diffusing particles preferably contains an inorganic pigment. Moreover, by adding an inorganic pigment to the light diffusing particles, the specular gloss can be adjusted to 10% or less with a smaller amount of resin beads as compared with the case using only resin beads, and therefore even when images are blurred by the lens effect, the degree thereof can be reduced. Moreover, if the content of the light diffusing particles is reduced as far as possible as described above, the light diffusing particles and the binder component can be more firmly adhered to the substrate, and therefore physical strength of the light diffusing layer can be increased.

The shape of such light diffusing particles is not particularly limited, and they may have any of irregular form, truly spherical form, spherical form, scaly form, acicular form and so forth. The size of the light diffusing particles may be suitably selected depending on the thickness of the light diffusing layer, and therefore it is not particularly limited. However, light diffusing particles having a size of generally about 1 to 50 μm, preferably about 3 to 20 μm, are preferably used. Light diffusing particles at least parts of which protrude from the light diffusing layer are preferably selected. By making parts of the light diffusing particles protrude from the light diffusing layer, it becomes easy to adjust the specular gloss to 10% or less.

The content of the light diffusing particles in the light diffusing layer cannot be uniquely defined, because it may vary depending on the type of the light diffusing particles and thickness of the light diffusing layer. However, the content is, as for the lower limit, desirably 50 parts by weight or more, preferably 80 parts by weight or more, and as for the upper limit, desirably 300 parts by weight or less, preferably 200 parts by weight or less, for 100 parts by weight of the binder component.

If the content of the light diffusing particles is 50 parts by weight or more, haze of the transmission screen can be made 80% or more, and it becomes easy to adjust the specular gloss to be 10% or less. If the content of the light diffusing particles is 300 parts by weight or less, the total light transmission can be made 60% or more.

Further, so long as the functions of the transmission screen of the present invention are not degraded, the light diffusing layer may be added various additives such as crosslinking agents, lubricants, dyes, fluorescent brightening agents, colorants, pigments, antistatic agents, flame retardants, antibacterial agents, antifungal agents, ultraviolet absorbers, light stabilizers, heat stabilizers, antioxidants, plasticizers, leveling agents, flow regulators, antifoams and dispersing agents.

The thickness of the light diffusing layer is determined depending on the size, content etc. of the light diffusing particles, and specific haze and specular gloss can be obtained by adjusting the thickness. Therefore, when the size and content of the light diffusing particles mentioned above are taken into consideration, it is desirable that as for the lower limit, the thickness is 5 μm or larger, preferably 10 μm or larger, and as for the upper limit, the thickness is 50 μm or smaller, preferably 30 μm or smaller. If the thickness of the light diffusing layer is 5 μm or larger, the haze can be 80% or more, and in addition, the light diffusing particles and the binder component can be adhered to the substrate. Further, if the thickness of the light diffusing layer is 50 μm or smaller, the specular gloss can be adjusted to be 10% or less, and the total light transmission can be prevented from becoming 60% or less.

As for the method for adjusting the haze to be 80% or more in the aforementioned configuration, it can easily be adjusted by choosing or controlling the type and content of the light diffusing particles and the thickness of the light diffusing layer, and it can also be easily adjusted by, for example, subjecting the light diffusing layer to sandblast, chemical etching or the like. Moreover, when the substrate is a plastic film, the haze can also be adjusted by embossing. The haze can also be finely adjusted by choosing or controlling the type and content of the matting agent to be contained in the resin layer and the thickness of the resin layer.

As for the method for adjusting the specular gloss to be 10% or less in the aforementioned configuration, it can easily be adjusted by controlling the content and size of the light diffusing particles to be contained in the light diffusing layer and the thickness of the light diffusing layer, and it can also be easily adjusted by subjecting the light diffusing layer to sandblast, chemical etching, or embossing, like the adjustment of haze described above. Further, the specular gloss can also be adjusted by forming the light diffusing layer beforehand on a film of which surface shape is adjusted and transferring this light diffusing layer to a substrate.

Further, when the substrate 1 having a light diffusing property is constituted by a single layer consisting of the substrate 1 containing the light diffusing particles (FIG. 2), a material similar to the glass and plastic film explained for the substrate 11 mentioned above can be used, and such a material can be melted, mixed with light diffusing particles and molded into a shape of plate or film to prepare the substrate.

When the substrate 1 having a light diffusing property is constituted by the substrate 1 containing a matting agent and the light diffusing layer 12 formed on the substrate (FIG. 6), it is preferable to use a material showing high surface hardness among the glass, plastic films etc. explained above for the substrate 11 for prevention of scratching. Such a material showing high surface hardness can be melted, mixed with a matting agent and molded into a shape of plate or film to prepare the substrate 11.

In addition, the substrate 1 having a light diffusing property may be one obtained by directly subjecting the substrate to sandblast, chemical etching or embossing, and thereby the haze and specular gloss can also be adjusted to be within the predetermined ranges without providing the light diffusing layer.

Hereafter, the method for producing the transmission screen of the present invention will be explained. Although the production method would differ depending on the structure of the transmission screen, the transmission screen having any structure can be prepared by a combination of known coating techniques and lamination techniques. As an example, a method for producing the transmission screen having the structure shown in FIG. 1 will be explained.

Such a transmission screen can be prepared as follows. A coating solution for the resin layer is prepared by dispersing or dissolving the aforementioned ionizing radiation curable resin, matting agent and additives, added if needed, in a solvent, and the coating solution is coated on one surface of the substrate described above by a known coating method such as bar coating, die coating, blade coating, spin coating, roller coating, gravure coating, curtain coating, spray coating and screen printing and dried. Then, the coated layer is irradiated with ionizing radiation and thereby cured to form the resin layer. Separately, a coating solution for the light diffusing layer is prepared by dispersing or dissolving the aforementioned binder component, light diffusing particles and additives, added as required, and coated on the other surface of the aforementioned substrate by a conventionally known coating method similar to those mentioned above and dried. Then, the coated layer is cured by irradiation of ionizing radiation or heat as required to form the light diffusing layer to prepare the transmission screen. In the preparation of such a transmission screen, either the resin layer or the light diffusing layer may be formed first.

As the method for irradiating ionizing radiation, an ultraviolet ray having a wavelength in the range of 100 to 400 nm, preferably 200 to 400 nm, emitted from an ultra-high pressure mercury lamp, high-pressure mercury lamp, low-pressure mercury lamp, carbon arc, metal halide lamp or the like is irradiated, or an electron beam having a wavelength of 100 nm or smaller emitted from a scanning type or curtain type electron beam accelerator can be irradiated.

Although preferred embodiments of the structure and components of the transmission screen of the present invention are explained above, the transmission screen of the present invention is not limited to those shown in FIGS. 1 to 6, and it can be prepared by combining the aforementioned components and known materials so that the characteristics thereof should not be degraded.

If the transmission screen of the present invention is used with a projector disposed on the side opposite to the side of the writable and erasable surface as shown in FIG. 7, it can be used so that writing with a marker for white boards and erasing should be possible on images projected from the projector.

In the use mentioned above, because one surface of the screen is a writable and erasable surface, images projected from the projector do not become hard to see due to projection of the images on the body of writer, and writing can be easily done while seeing the images.

Moreover, by adjusting the specular gloss of the writable and erasable surface to be 70 to 135%, characters etc. written with a marker for white boards can be erased, images projected from a projector, in particular, images of dark color such as black or dark blue are not whitely observed, and thus reduction of sharpness of the images can be prevented.

Further, by adjusting the haze to be 80% or more and the specular gloss of the surface on the side opposite to the writable and erasable surface side to be 10% or less, the light source of the projector placed in the back is not seen transparently, and images projected from a projector can be formed as sharp images.

Hereafter, a rear projection monitor utilizing the transmission screen of the present invention will be explained. A rear projection monitor is an apparatus for projecting images of personal computers, televisions and so forth displayed on a display apparatus such as liquid crystal panel and CRTs from a projector onto a transmission screen via a reflection mirror, and in the rear projection monitor of the present invention, the transmission screen having the writable and erasable surface described above is disposed so that the writable and erasable surface should face observers.

It is sufficient that the rear projection monitor of the present invention should comprise a projector, a reflective mirror and a transmission screen, and these components should be geometric optically disposed so that images projected from the projector should be formed on the transmission screen, and it may comprise a single reflection mirror or multiple reflection mirrors.

One embodiment of the rear projection monitor to which the present invention is applied is shown in FIG. 8. As shown in the drawing, the rear projection monitor 100 of this embodiment is provided with a transmission screen 101, a support 102 supporting the screen 101, a projector 103 installed below the support 102, and a pair of mirrors for reflecting lights projected from projector 103, an upper mirror 104 and a lower mirror 105, as the major components.

The support 102 comprises a pedestal member 106 carrying the projector 103 and a support member 107 supporting the transmission screen 101, wherein the pedestal member 106 and the support member 107 are connected with hinges 108, and the support member 107 can be folded. The upper mirror 104 is fixed to the upper end of the support member 107 so that it should form a predetermined angle with respect to the screen 101, and the lower mirror 105 is fixed to the pedestal member 106 so that it should form a predetermined angle with respect to the projector 103. The fixed angles of these mirrors are adjusted so that lights projected from the projector 103 should be reflected by the lower mirror 105 and the upper mirror 104 and then projected onto the back surface of the screen 101.

The transmission screen 101 is, for example, a transmission screen having any one of the structures shown in FIGS. 1 to 6, and it is fixed so that the writable and erasable surface 2 should be on the side of observers (in the drawing, the side opposite to the side on which the upper mirror is fixed).

In such a configuration, lights projected from the projector 103 are reflected by the lower mirror 105 and the upper mirror 104 and then form images on the transmission screen 101. A user (e.g., a person performing presentation by using this monitor) can write characters etc. with a marker for white boards at desired positions and erase them with seeing the images projected on the transmission screen 101. On this occasion, the user does not interrupt the lights from the projector 103, and therefore the user can enjoy favorable workability for writing. In addition, because the projector 103 is disposed below the screen 101 in this rear projection monitor, not only lights directly coming from the projector do not inhibit observation of the images, but also the user can perform the writing and erasing operations without feeling glare.

EXAMPLES

Hereafter, the present invention will be explained in more detail with reference to examples. In the following examples, the term and symbol "part" and "%" are used on weight basis, unless particularly indicated.

Example 1

Ingredient of the following composition was mixed and then subjected to a dispersion operation using a sand mill dispersion apparatus (Nano Mill, Asada Iron Works CO., LTD.) to prepare Light diffusing particle dispersion A.

Then, on one surface of a 3-mm thick silicate glass plate as a substrate, Coating solution B for resin layer having the following composition was applied, dried and irradiated with an ultraviolet ray from a high-pressure mercury lamp to form a resin layer having a thickness of 6 µm. Then, on the other surface of this substrate, Coating solution C for light diffusing layer having the following composition was applied, dried and then cured at 60° C. for 24 hours to form a light diffusing layer having a thickness of 20 µm and thereby prepare a transmission screen of Example 1.

| <Composition of Coating solution B for resin layer> | |
|---|---|
| Ultraviolet curing type resin (acrylic resin, Diabeam UR6530, Mitsubishi Rayon Co., Ltd., solid content: 100%) | 60.0 parts |
| Matting agent (silica, Sylysia 446, Fuji Silysia Chemical Ltd., mean particle size: 4.5 μm) | 3.0 parts |
| Pigment (silica, Aerosil R-972, NIPPON AEROSIL CO., LTD., mean particle size: 30 nm) | 3.0 parts |
| Photopolymerization initiator (Irgacure 651, Chiba Specialty Chemicals Co., Ltd.) | 0.3 part |
| Methyl ethyl ketone | 80.0 parts |
| Toluene | 60.0 parts |
| <Composition of Light diffusing particle dispersion A> | |
| Light diffusing particles (silica, Sylysia 730, Fuji Silysia Chemical Ltd., mean particle size: 4 μm) | 6.0 parts |
| Pigment (silica, Aerosil R-972, NIPPON AEROSIL CO., LTD., mean particle size: 16 nm) | 2.0 parts |
| Acrylic resin (ACRYDIC A807, Dainippon Ink & Chemicals, Inc., solid content: 50%) | 9.5 parts |
| Methyl ethyl ketone | 28.0 parts |
| Toluene | 28.0 parts |
| <Composition of Coating solution C for light diffusing layer> | |
| Light diffusing particle dispersion A | 73.5 parts |
| Polyisocyanate (Takenate D110N, Mitsui Takeda Chemicals, Inc., solid content: 60%) | 1.6 parts |

Example 2

On one surface of a 100-μm thick transparent polyethylene terephthalate film (Lumilar T-60, Toray Industries, Inc.), a resin layer was formed in the same manner as in Example 1, and on the other surface, Coating solution D for adhesive layer having the following composition was applied and dried to form an adhesive layer having a thickness of 20 μm. The obtained laminate was adhered to one surface of the same silicate glass plate as that used in Example 1.

Then, on one surface of the same polyethylene terephthalate film as that used above, a light diffusing layer was formed in the same manner as in Example 1, and on the other surface, an adhesive layer was formed in the same manner as described above. This laminate was adhered to the other surface of the aforementioned silicate glass plate to prepare a transmission screen of Example 2.

| <Composition of Coating solution D for adhesive layer> | |
|---|---|
| Acrylic adhesive (Olibain BPS1109, TOYO INK MFG. CO., LTD., solid content: 40%) | 100.0 parts |
| Polyisocyanate (Olibain BHS8515, TOYO INK MFG. CO., LTD., solid content: 38%) | 2.5 parts |
| Ethyl acetate | 100.0 parts |

Example 3

A transmission screen of Example 3 was prepared in the same manner as in Example 1 except that Coating solution E for resin layer, Light diffusing particle dispersion F and Coating solution G for light diffusing layer having the following compositions were used instead of Coating solution B for resin layer, Light diffusing particle dispersion A and Coating solution C for light diffusing layer used in Example 1, respectively, and a light diffusing layer having a thickness of 15 μm was formed.

| <Composition of Coating solution E for resin layer> | |
|---|---|
| Ultraviolet curing type resin (acrylic resin, Diabeam UR6530, Mitsubishi Rayon Co., Ltd., solid content: 100%) | 60.0 parts |
| Matting agent (silica, Sylysia 446, Fuji Silysia Chemical Ltd., mean particle size: 4.5 μm) | 5.0 parts |
| Pigment (silica, Aerosil R-972, NIPPON AEROSIL CO., LTD., mean particle size: 30 nm) | 2.5 parts |
| Photopolymerization initiator (Irgacure 651, Chiba Specialty Chemicals Co., Ltd.) | 0.3 part |
| Methyl ethyl ketone | 80.0 parts |
| Toluene | 60.0 parts |
| <Composition of Light diffusing particle dispersion F> | |
| Light diffusing particles (styrene resin beads, Technopolymer SBX-8, Sekisui Plastics Co., Ltd., mean particle size: 8 μm) | 38.0 parts |
| Acrylic resin (ACRYDIC A807, Dainippon Ink & Chemicals, Inc., solid content: 50%) | 30.0 parts |
| Methyl ethyl ketone | 31.0 parts |
| Toluene | 31.0 parts |
| <Composition of Coating solution G for light diffusing layer> | |
| Light diffusing particle dispersion F | 132.0 parts |
| Polyisocyanate (Takenate D110N, Mitsui Takeda Chemicals, Inc., solid content: 60%) | 7.0 parts |
| Methyl ethyl ketone | 50.0 parts |
| Toluene | 50.0 parts |

Example 4

A transmission screen of Example 4 was prepared in the same manner as in Example 1 except that Coating solution H for resin layer, Light diffusing particle dispersion I and Coating solution J for light diffusing layer having the following compositions were used instead of Coating solution B for resin layer, Light diffusing particle dispersion A and Coating solution C for light diffusing layer used in Example 1, respectively, and a light diffusing layer having a thickness of 15 μm was formed.

| <Composition of Coating solution H for resin layer> | |
|---|---|
| Ultraviolet curing type resin (acrylic resin, Diabeam UR6530, Mitsubishi Rayon Co., Ltd., solid content: 100%) | 60.0 parts |
| Matting agent (silica, Sylysia 446, Fuji Silysia Chemical Ltd., mean particle size: 4.5 μm) | 2.0 parts |
| Pigment (silica, Aerosil R-972, NIPPON AEROSIL CO., LTD., mean particle size: 30 nm) | 3.0 parts |
| Photopolymerization initiator (Irgacure 651, Chiba Specialty Chemicals Co., Ltd.) | 0.3 part |
| Methyl ethyl ketone | 80.0 parts |
| Toluene | 60.0 parts |
| <Composition of Light diffusing particle dispersion I> | |
| Light diffusing particles (styrene resin beads, Technopolymer SBX-8, | 8.5 parts |

-continued

| | |
|---|---|
| Sekisui Plastics Co., Ltd., mean particle size: 8 μm) | |
| Acrylic resin (ACRYDIC A807, Dainippon Ink & Chemicals, Inc., solid content: 50%) | 10.0 parts |
| Methyl ethyl ketone | 30.0 parts |
| Toluene | 30.0 parts |
| <Composition of Coating solution J for light diffusing layer> | |
| Light diffusing particle dispersion I | 78.5 parts |
| Polyisocyanate (Takenate D110N, Mitsui Takeda Chemicals, Inc., solid content: 60%) | 2.0 parts |

Example 5

A transmission screen of Example 5 was prepared in the same manner as in Example 4 except that Coating solution K for resin layer having the following composition was used instead of Coating solution H for resin layer used in Example 4.

| <Composition of Coating solution K for resin layer> | |
|---|---|
| Ultraviolet curing type resin (acrylic resin, Diabeam UR6530, Mitsubishi Rayon Co., Ltd., solid content: 100%) | 60.0 parts |
| Matting agent (styrene resin beads, Technopolymer SBX-8, Sekisui Plastics Co., Ltd., mean particle size: 8 μm) | 3.5 parts |
| Photopolymerization initiator (Irgacure 651, Chiba Specialty Chemicals Co., Ltd.) | 0.3 part |
| Methyl ethyl ketone | 80.0 parts |
| Toluene | 60.0 parts |

Example 6

A transmission screen of Example 6 was prepared in the same manner as in Example 1 except that Coating solution L for light diffusing layer having the following composition was used instead of Coating solution C for light diffusing layer used in Example 1, and a light diffusing layer having a thickness of 5.0 μm was formed.

| <Composition of Coating solution L for light diffusing layer> | |
|---|---|
| Light diffusing particles (methacrylic resin beads, MX-500, Soken Chemical & Engineering Co., Ltd, mean particle size: 5 μm) | 2.0 parts |
| Ultraviolet curing type resin (acrylic resin, Diabeam UR6530, Mitsubishi Rayon Co., Ltd., solid content: 100%) | 20.0 parts |
| Photopolymerization initiator (Irgacure 651, Chiba Specialty Chemicals Co., Ltd.) | 0.1 part |
| Methyl ethyl ketone | 55.0 parts |

Example 7

A transparent adhesive film (Viewful EP, Kimoto Co., Ltd.) was adhered to the surface of the transmission screen of Example 1 on the light diffusing layer side to prepare a transmission screen of Example 7. The total thickness of the transparent adhesive film was 83 μm, and the thickness of the adhesive layer within the total thickness was 8 μm.

Example 8

A transmission screen of Example 8 was prepared in the same manner as in Example 1 except that Coating solution M for resin layer having the following composition was used instead of Coating solution B for resin layer used in Example 1.

| <Composition of Coating solution M for resin layer> | |
|---|---|
| Ultraviolet curing type resin (acrylic resin, Diabeam UR6530, Mitsubishi Rayon Co., Ltd., solid content: 100%) | 60.0 parts |
| Photopolymerization initiator (Irgacure 651, Chiba Specialty Chemicals Co., Ltd.) | 0.3 part |
| Methyl ethyl ketone | 80.0 parts |
| Toluene | 60.0 parts |

Example 9

A transmission screen of Example 9 was prepared in the same manner as in Example 1 except that Coating solution N for resin layer having the following composition was used instead of Coating solution B for resin layer used in Example 1.

| <Composition of Coating solution N for resin layer> | |
|---|---|
| Ultraviolet curing type resin (acrylic resin, Diabeam UR6530, Mitsubishi Rayon Co., Ltd., solid content: 100%) | 60.0 parts |
| Matting agent (silica, Sylysia 446, Fuji Silysia Chemical Ltd., mean particle size: 4.5 μm) | 1.0 part |
| Photopolymerization initiator (Irgacure 651, Chiba Specialty Chemicals Co., Ltd.) | 0.3 part |
| Methyl ethyl ketone | 80.0 parts |
| Toluene | 60.0 parts |

COMPARATIVE EXAMPLE

A reflection type screen for projection from a confronting position (Magnet Screen WOL-M12, Izumi Co., Ltd.) with which writing with a marker for white boards and erasing are possible on images projected from a projector was used as a reflection type screen of comparative example.

With each of the transmission screens obtained in the examples, an observer 5, a writer 6, a transmission screen 3 described in one of the examples and a projector 4 (XV-P3, Sharp Corporation) were disposed in this order as shown in FIG. 7, and images were projected. Then, the writer wrote characters with a marker for white boards on the images.

With the reflection type screen of the comparative example, an observer 5, a projector 4 (XV-P3, Sharp Corporation), a writer 6 and the reflection type screen 7 were disposed in this order as shown in FIG. 9, and images were projected. Then, the writer wrote characters with a marker for white boards on the images.

As a result, with the transmission screens obtained in the examples, the images projected from the projector were not distortedly projected according to the unevenness of the body of the writer, and thus the images were very easy to see. In that occasion, the observer could visually recognize a portion hidden by the body of the writer by moving the head so as to avoid the body of the writer. In addition, the writer could easily write while seeing the images, and even when the writer turned toward the observer, the light from the projector did not directly irradiate the eyes, unlike the cases of reflection type screens, and thus the eyes were not hurt.

On the other hand, with the reflection type screen of the comparative example, the images projected from the projector were distortedly projected according to the unevenness of the body of the writer, and thus the images became very hard to see. Further, the light from the projector was interrupted by the body of the writer himself, and thus it became difficult for the writer to write at desired positions. In addition, when the writer turned toward the observer, the light from the projector directly irradiated the eyes, and therefore the eyes were hurt.

Then, haze according to JIS K7136:2000 and total light transmission according to JIS K7361-1:1997 of the transmission screens of the examples were measured by using a haze meter (NDH2000, Nihon Denshoku Kogyo Co., Ltd.). The measurement was performed by using the surface of the light diffusing layer as a light incident surface.

Further, specular gloss of the surface of the resin layer (i.e., the writable and erasable surface) and the surface of the light diffusing layer (i.e., the surface from which the light from the projector entered) was measured by using a glossimeter (SM4/UGV-5K, Suga Test Instruments Co., Ltd.) according to JIS K5600-4-7:1999. The specular gloss was measured by using a CIE standard illuminant C with a geometric condition of 60°. The measurement results are shown in Table 1.

Then, images were projected by using the transmission screens of the examples as described above, i.e., as shown in FIG. 7, and (a) whether the light source was transparently seen or not, and (b) whether the images were whitely seen or not were evaluated. The evaluation results are also shown in Table 1.

(a) When the light source of the projector was not seen through the screen at all, the result was indicated with a symbol "○", when the light source was not seen through the screen, but there were locally bright portions, the result was indicated with a symbol "Δ", and when the light source was transparently seen, the result was indicated with a symbol "X".

(b) When black portions of the projected images were sharply observed in black, the result was indicated with a symbol "○", and when the images were whitish and unclear, the result was indicated with a symbol "X".

As seen from the results shown in Table 1, the projected images of black portions were sharp on the transmission screens of Examples 1 to 7, because the specular gloss of the writable and erasable surfaces of them was adjusted to be within the predetermined range. In addition, all the transmission screens of the examples showed favorable writing and erasing property for writing with a marker for white boards.

With the transmission screens of Examples 1 and 2, the light source of the projector was not transparently seen at all even with a relatively small content of the light diffusing particles, because inorganic particles were used as the light diffusing particles.

The transmission screen of Example 3 showed a low specular gloss for the surface opposite to the writable and erasable surface, because resin beads were used as the light diffusing particles with a relatively large content of the light diffusing particles, and thus the light source of the projector was not seen at all thorough the screen.

The transmission screens of Examples 4 and 5 showed a specular gloss for the surface opposite to the writable and erasable surface higher than that observed in Example 1, because resin beads were used as the light diffusing particles although the content of the light diffusing particles was comparable to that used in Example 1. Therefore, with the transmission screen of Example 4 and 5, the light source was not seen through the screen, but there were locally bright portions.

Since the transmission screens of Examples 6 and 7 showed a specular gloss exceeding the predetermined value for the surface opposite to the writable and erasable surface, the light source of the projector was seen thorough the screens. Moreover, since the haze of the transmission screen of Example 6 was less than 80%, the screen showed poor light diffusing property, and the images were not sharply projected at the edges of the screen. Moreover, with the transmission screen of Example 6, the images were blurred by the lens effect and became hard to see.

Since the transmission screens of Examples 8 and 9 showed a specular gloss exceeding the predetermined value

TABLE 1

| | Haze (%) | Total light transmission (%) | Specular gloss of writable and erasable surface (%) | Specular gloss of surface opposite to writable and erasable surface (%) | (a) Light source | (b) Sharpness of images |
|---|---|---|---|---|---|---|
| Example 1 | 96 | 85 | 105 | 3 | ○ | ○ |
| Example 2 | 96 | 84 | 105 | 3 | ○ | ○ |
| Example 3 | 96 | 80 | 80 | 5 | ○ | ○ |
| Example 4 | 95 | 89 | 120 | 8 | Δ | ○ |
| Example 5 | 95 | 89 | 115 | 8 | Δ | ○ |
| Example 6 | 60 | 89 | 105 | 18 | X | ○ |
| Example 7 | 96 | 80 | 105 | 130 | X | ○ |
| Example 8 | 96 | 86 | 150 | 3 | ○ | X |
| Example 9 | 96 | 86 | 140 | 3 | ○ | X | for the writable and erasable surface, the projected images of the black portions were whitely recognized, and became unsharp.

DESCRIPTION OF NOTATIONS

Figure 1:
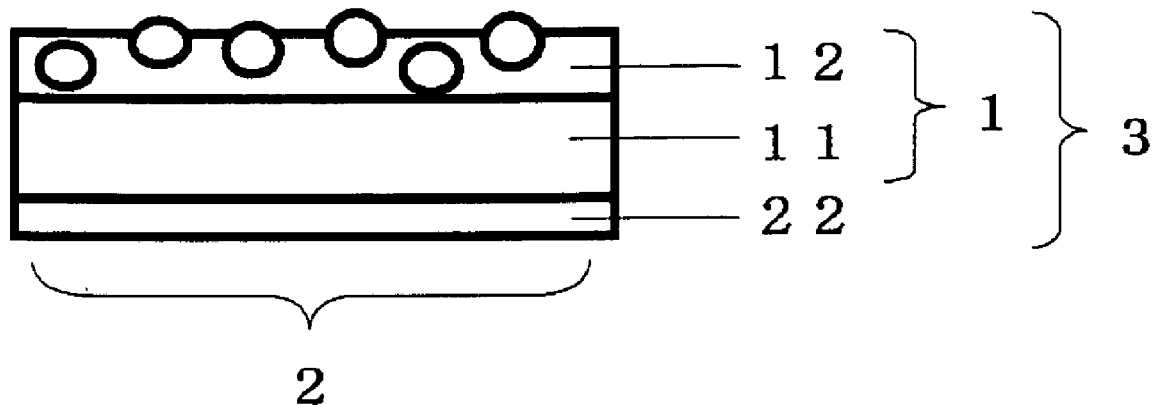
[FIG. 1] A sectional view showing one embodiment of the transmission screen of the present invention.
Figure 2:
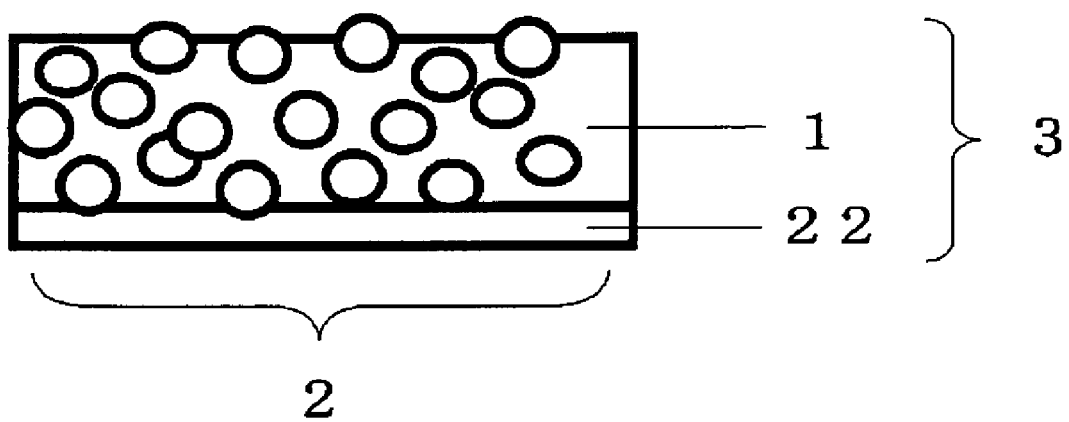
[FIG. 2] A sectional view showing another embodiment of the transmission screen of the present invention.
Figure 3:
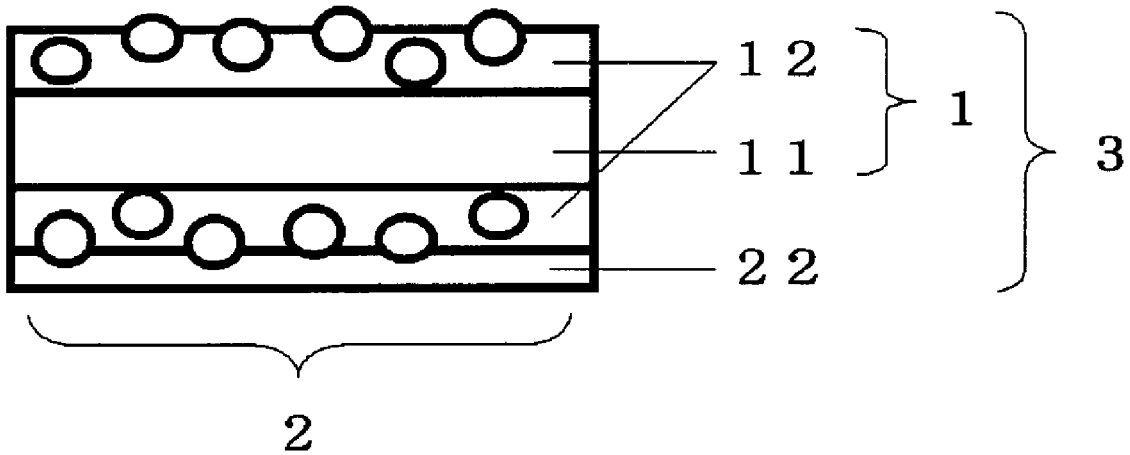
[FIG. 3] A sectional view showing another embodiment of the transmission screen of the present invention.
Figure 4:
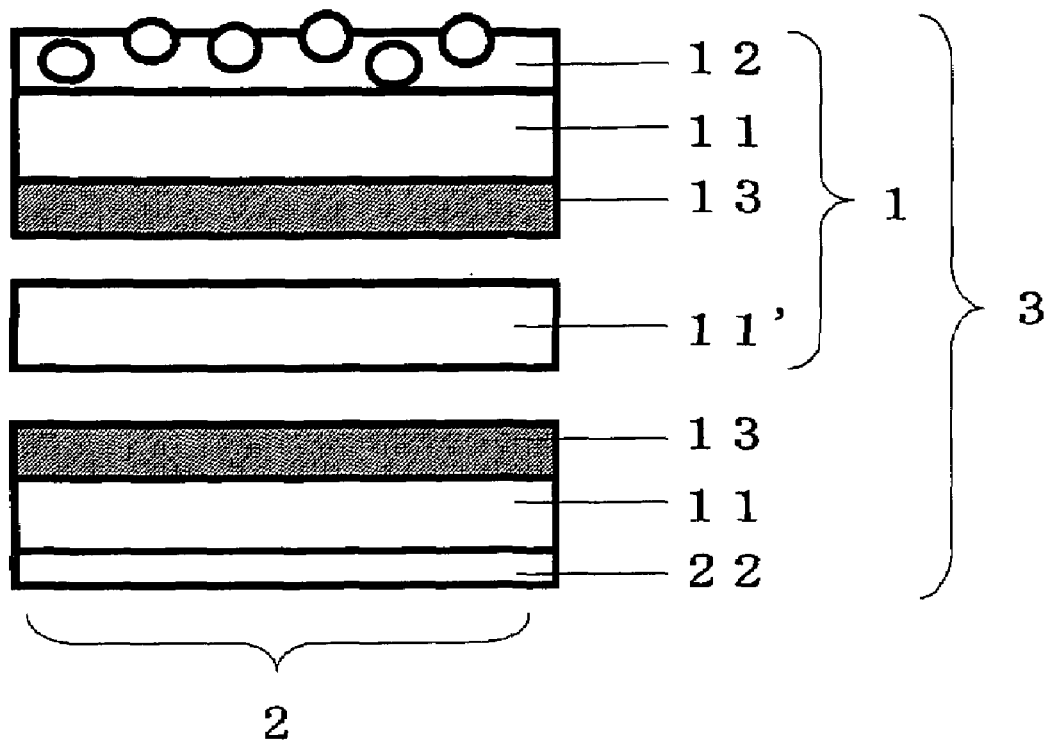
[FIG. 4] A sectional view showing another embodiment of the transmission screen of the present invention.
Figure 5:
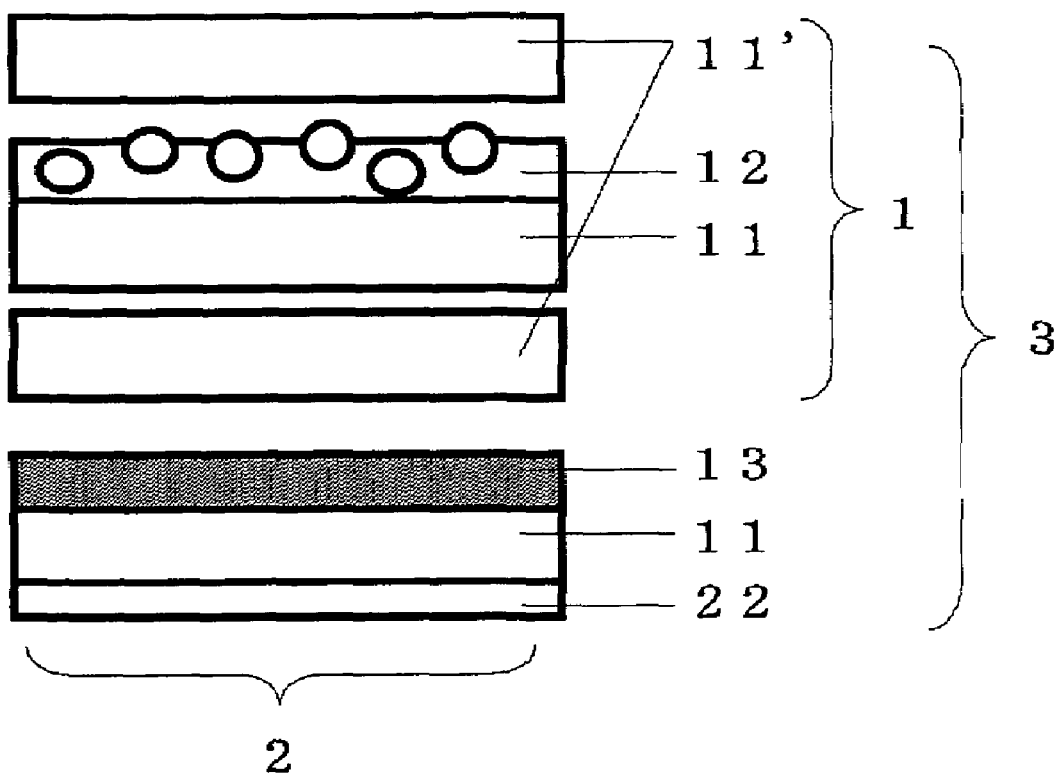
[FIG. 5] A sectional view showing another embodiment of the transmission screen of the present invention.
Figure 6:
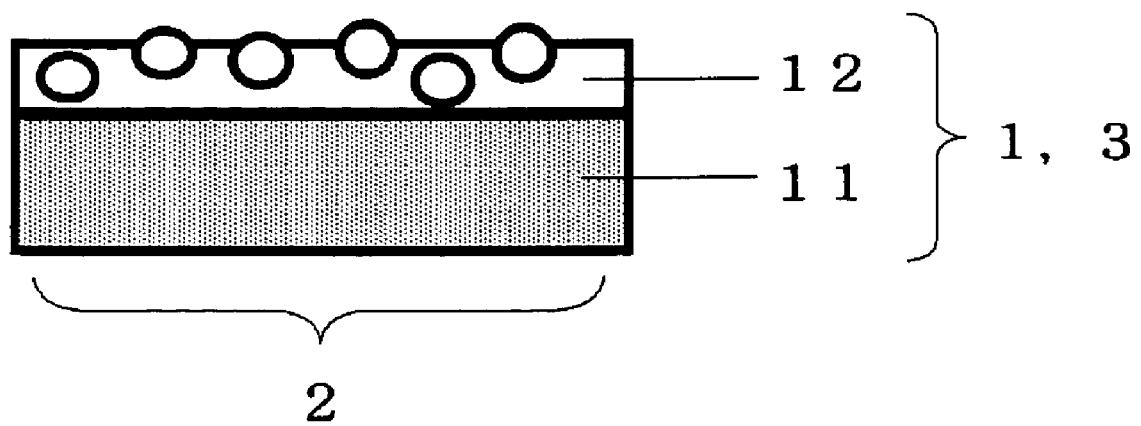
[FIG. 6] A sectional view showing another embodiment of the transmission screen of the present invention.
Figure 7:
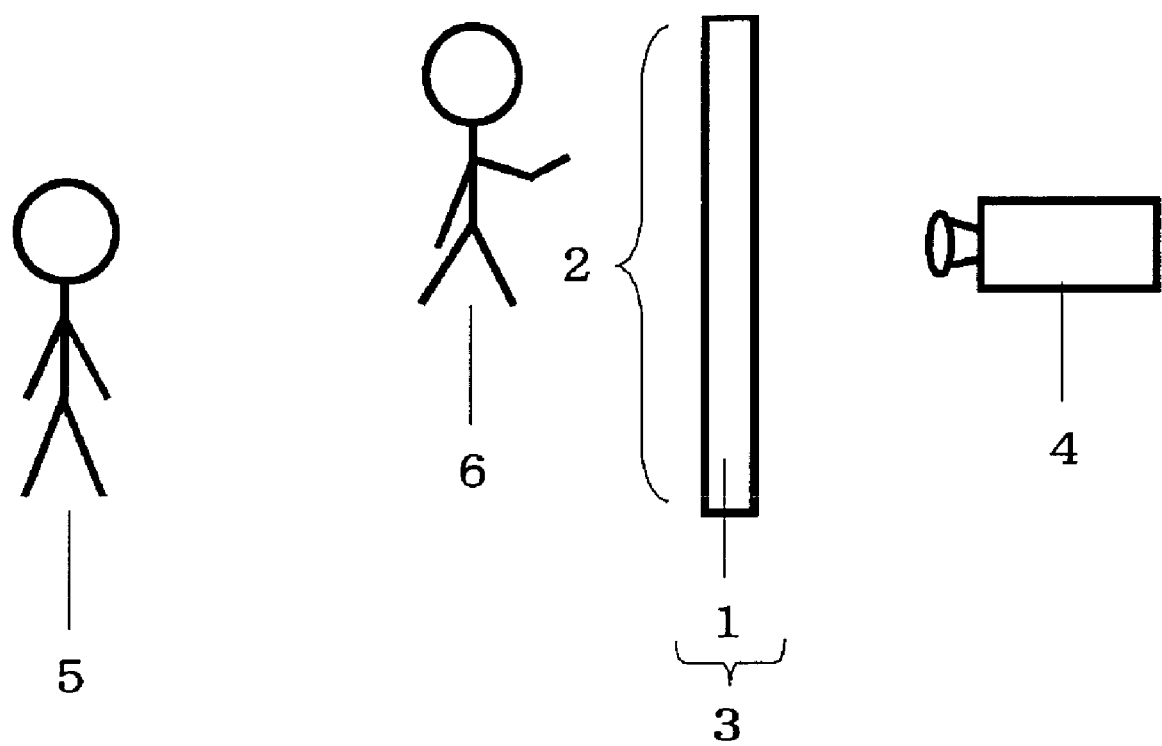
[FIG. 7] A schematic view of an example of use of the transmission screen of the present invention.
Figure 8:
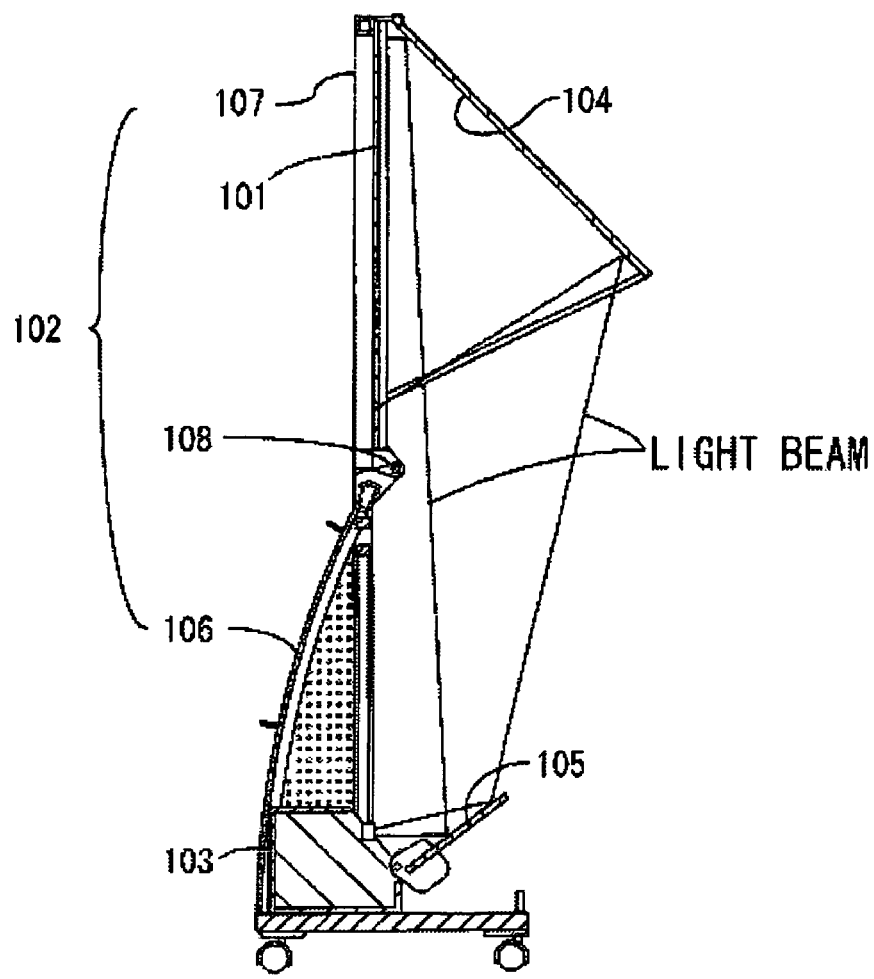
[FIG. 8] A side view showing one embodiment of the rear projection monitor of the present invention.
Figure 9:
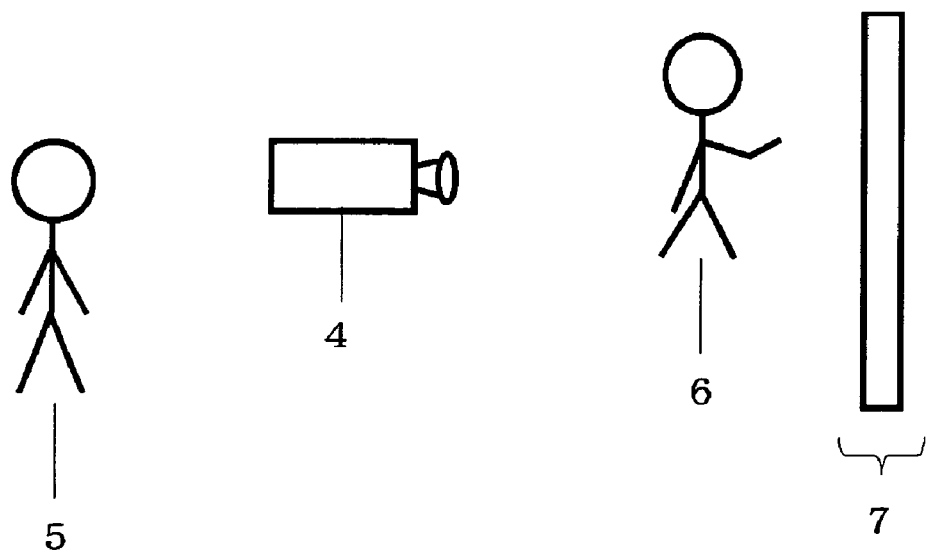
[FIG. 9] A schematic view of an example of use of the reflection type screen of the comparative example.

1 . . . Substrate having a light diffusing property, 2 . . . writable and erasable surface, 3 and 101 . . . transmission screen, 4 and 103 . . . projector, 5 . . . observer, 6 . . . writer, 7 . . . reflection type screen, 11 . . . substrate, 11' . . . another substrate, 12 . . . light diffusing layer, 13 . . . adhesive layer, 22 . . . resin layer, 100 . . . rear projection monitor, 104 . . . upper mirror, and 105 . . . lower mirror.

The invention claimed is:

1. A transmission screen having a writable and erasable surface for one side wherein the writable and erasable surface has a specular gloss (JIS K5600-4-7:1999) of 70 to 135%.

2. The transmission screen according to claim 1, wherein the writable and erasable surface is formed with a resin layer containing an ionizing radiation curable resin and a matting agent.

3. A transmission screen having a writable and erasable surface for one side wherein the writable and erasable surface has a specular gloss (JIS K5600-4-7:1999) of 70 to 135% and wherein the transmission screen has a haze (JIS K7136:2000) of 80% or more, and the surface opposite to the writable and erasable surface has a specular gloss (JIS K5600-4-7:1999) of is 10% or less.

4. The transmission screen according to claim 1, which has a light diffusing layer comprising a binder component and light diffusing particles on the side opposite to the writable and erasable surface side.

5. A transmission screen having a light incident surface from which a light projected from a projector enters and a light emitting surface on the side opposite to the light incident surface side and forming an image from the light projected from the projector, wherein the light incident surface has a specular gloss (JIS K5600-4-7:1999) of 10% or less, the light emitting surface has a specular gloss (JIS K5600-4-7:1999) of 70 to 135%, and the screen as a whole has a haze (JIS K7136:2000) of 80% or more.

6. The transmission screen according to claim 5, wherein the transmission screen has a resin layer comprising an ionizing radiation curable resin and a matting agent as an outermost layer, and the surface of the resin layer constitutes the light emitting surface.

7. The transmission screen according to claim 5, which has a light diffusing layer comprising a binder component and light diffusing particles between the light incident surface and the light emitting surface.

8. The transmission screen according to claim 5, wherein writing with a marker for white boards and erasing are possible on the light emitting surface.

9. A transmission screen comprising a substrate having a light diffusing property wherein a light from a projector is projected to one surface of the substrate to form an image, and the projected image can be observed from another surface of the substrate, which is provided on the other surface with a writable layer on which writing with a marker for white boards and erasing are possible and wherein the surface of the writable layer has a specular gloss (JIS K5600-4-7:1999) of 70 to 135%.

10. The transmission screen according to claim 9, wherein the writable layer consists of a resin layer comprising an ionizing radiation curable resin and a matting agent.

11. A transmission screen comprising a substrate having a light diffusing property wherein a light from a projector is projected to one surface of the substrate to form an image, and the projected image can be observed from another surface of the substrate, which is provided on the other surface with a writable layer on which writing with a marker for white boards and erasing are possible, wherein the transmission screen has a haze (JIS K7136:2000) of 80% or more, and the surface opposite to the writable layer has a specular gloss (JIS K5600-4-7:1999) of 10% or less.

12. A rear projection monitor comprising a projector for projecting a displayed image displayed on an image display unit, a reflection mirror for reflecting a light projected from the projector and a transmission screen having a light incident surface and a light emitting surface and receiving a reflected light from the reflection mirror with the light incident surface to form an image, wherein said transmission screen is a transmission screen according to claim 1.

13. The transmission screen according to claim 1, wherein the transmission screen has a haze (JIS K7136:2000) of 80% or more, and the surface opposite to the writable and erasable surface has a specular gloss (JIS K5600-4-7:1999) of is 10% or less.

14. The transmission screen according to claim 2, wherein the transmission screen has a haze (JIS K7136:2000) of 80% or more, and the surface opposite to the writable and erasable surface has a specular gloss (JIS K5600-4-7:1999) of is 10% or less.

15. The transmission screen according to claim 2, which has a light diffusing layer comprising a binder component and light diffusing particles on the side opposite to the writable and erasable surface side.

16. The transmission screen according to claim 3, which has a light diffusing layer comprising a binder component and light diffusing particles on the side opposite to the writable and erasable surface side.

17. A rear projection monitor comprising a projector for projecting a displayed image displayed on an image display unit, a reflection mirror for reflecting a light projected from the projector and a transmission screen having a light incident surface and a light emitting surface and receiving a reflected light from the reflection mirror with the light incident surface to form an image, wherein said transmission screen is a transmission screen according to claim 3.

18. A rear projection monitor comprising a projector for projecting a displayed image displayed on an image display unit, a reflection mirror for reflecting a light projected from the projector and a transmission screen having a light incident surface and a light emitting surface and receiving a reflected light from the reflection mirror with the light incident surface to form an image, wherein said transmission screen is a transmission screen according to claim 9.

19. A rear projection monitor comprising a projector for projecting a displayed image displayed on an image display unit, a reflection mirror for reflecting a light projected from the projector and a transmission screen having a light incident surface and a light emitting surface and receiving a reflected light from the reflection mirror with the light incident surface to form an image, wherein said transmission screen is a transmission screen according to claim 11.

\* \* \* \* \*

UNITED STATES PATENT AND TRADEMARK OFFICE
CERTIFICATE OF CORRECTION

PATENT NO. : 7,595,789 B2  Page 1 of 1
APPLICATION NO. : 10/562862
DATED : September 29, 2009
INVENTOR(S) : Nakata et al.

It is certified that error appears in the above-identified patent and that said Letters Patent is hereby corrected as shown below:

Column 20, Line 38 delete "is".

Column 20, Line 43 delete "is".

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,595,789 B2  Page 1 of 1
APPLICATION NO. : 10/562862
DATED : September 29, 2009
INVENTOR(S) : Nakata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Twenty-eighth Day of September, 2010

David J. Kappos
*Director of the United States Patent and Trademark Office*